United States Patent [19]
Michon et al.

[11] Patent Number: 5,357,337
[45] Date of Patent: Oct. 18, 1994

[54] HIGH SPEED INTERFEROMETER FOURIER TRANSFORM SPECTROMETER INCLUDING A WEIGHTED CAPACITIVE MATRIX

[75] Inventors: Gerald J. Michon, Waterford; Jerome J. Tiemann, Schenectady, both of N.Y.

[73] Assignee: General Electric Company, Schenectady, N.Y.

[21] Appl. No.: 979,022

[22] Filed: Nov. 20, 1992

[51] Int. Cl.⁵ .............................................. G01B 9/02
[52] U.S. Cl. ..................................... 356/346; 356/345
[58] Field of Search ................... 356/346, 345; 330/7, 330/69, 129, 307; 358/212, 213.31; 250/208.2

[56] References Cited
U.S. PATENT DOCUMENTS
4,807,038  2/1989  Michon ........................ 358/213.31

OTHER PUBLICATIONS
H. S. Caulfield, Handbook of Optical Holography, Chapter 10.9 "Spectroscopy" Academy Press, 1979.
Takayuki Okamoto, Satoshi Kawata & Shiegeo Minami, "Fourier Transform With a Self-Scanning Photodiode Array" Applied Optics, vol. 23, No. 2, Jan. 15, 1984.

*Primary Examiner*—Samuel A. Turner
*Assistant Examiner*—Russell C. Wolfe
*Attorney, Agent, or Firm*—Geoffrey H. Krauss

[57] ABSTRACT

An interferometer Fourier transform spectrometer, having increased speed, is capable of performing a Fourier transform in parallel, in analog form, using a weighted matrix. The spectrometer includes a linear detector array responsive to an interferogram. The detector array is coupled to a plurality of integrating sampling amplifiers. Each column of a group of columns of the matrix is coupled in parallel to a respective integrating sampling amplifier, and the output signals from each row of a group of rows form an output signal array.

24 Claims, 11 Drawing Sheets

HIGH SPEED INTERFEROMETER FOURIER TRANSFORM SPECTROMETER INCLUDING A WEIGHTED CAPACITIVE MATRIX

This invention was made with Government support under a contract awarded by an agency of the Government. The Government has certain rights in this invention.

BACKGROUND OF THE INVENTION

1. Field of the Invention

The invention is generally directed to interferometer Fourier transform spectrometers and, more particularly, to a high speed interferometer Fourier transform spectrometer which performs the Fourier transform in parallel, in analog form, using a weighted matrix multiplication.

2. Description of the Related Art

One type of known spectrometer is comprised of an input slit, a dispersion means which is typically a prism or a grating, and a detecting means to measure the magnitude of the spectral components. The input slit is required to avoid overlapping the spectra from different parts of the field of view. A drawback to this spectrometer is that it requires a very narrow slit for high resolution, which reduces the optical throughput of the system.

A spectrometer which does not require dispersing the spectrum, and thus makes available a larger flux of light, is an interferometer spectrometer. Instead of dispersing the spectrum, an interferometer spectrometer sorts the wavelengths by creating an interference pattern of the incoming light (an interferogram) and converting this pattern to a spectral distribution through use of a Fourier transform. The conventional Fourier transform spectrometers, as described in Takayuki Okamoto, Satoshi Kawata, & Shigeo Minami, "Fourier transform with a self-scanning photodiode array," Applied Optics, Vol. 23, No. 2, Jan. 15, 1984, use linear photodiode detector arrays and analog-to-digital converters, with the Fourier transform calculated in the digital domain. This architecture places very wide dynamic range requirements on the self scanned photodiode array, high precision and high speed requirements on the analog-to-digital converters, and very high speed computational demands for the Fourier transformation on the spectrometer.

BRIEF SUMMARY OF THE INVENTION

Accordingly, an object of the invention is to increase interferometer spectrometer processing speed while reducing its power consumption and size.

The interferometer spectrometer of the invention performs the Fourier transformation in analog form on a detector integrated circuit chip in time parallel, thereby reducing the needs for wide dynamic range multiplexing, high speed, high precision analog-to-digital conversion, and high speed Fourier transform computation.

Briefly, in accordance with a preferred embodiment of the invention, a high speed interferometer Fourier transform spectrometer is provided in the form of an optical system which causes incoming light to interfere with itself. A number of interferometer optical systems are described in Chapter 10.9, Spectroscopy, H. S. Caulfield, Handbook of Optical Holography, Academic Press, 1979. A linear detector array comprising a plurality of detector means is provided for receiving an interferogram. A weighted matrix is provided for performing an analog Fourier transform of the interferogram. The weighted matrix comprises a plurality of transform coefficient means arranged in a group of rows and a group of columns, with each transform coefficient means in a respective column coupled in parallel with a respective one of the detector means. A plurality of differential means are coupled to the weighted matrix, each respective one of the differential means being coupled to each specific transform coefficient means in a respective row of the weighted matrix which corresponds to a specific wavelength. The magnitude of a respective transform coefficient means is selected to optimize the trade-off between the goals of maximum output signal in response to light of said specific wavelength from a respective differential means and minimum output signal in response to light whose wavelength differs from said specific wavelength when the respective one of the differential means algebraically adds the signals coupled by the transform coefficient means from the detector means to the respective row of the weighted matrix.

In accordance with another preferred embodiment of the invention, a high speed interferometer Fourier transform spectrometer is comprised of an optical system and a linear detector array, including a plurality of detector means, for receiving an interferogram. A plurality of integrating sampling means are coupled to the linear detector array, with a respective one of the integrating sampling means coupled to a respective one of the detector means. A weighted matrix is provided to perform an analog Fourier transform of the interferogram. The matrix is comprised of a plurality of transform coefficient means arranged in a group of rows and a group of columns, with each transform coefficient means of a respective column coupled in parallel to a respective one of the integrating sampling means. The matrix in this embodiment performs a weighted algebraic summation of the input signals on each row thereof so as to respond to the interference pattern from light of a wavelength corresponding to that row. The magnitude of a respective transform coefficient means is selected to optimize the trade-off between the goals of maximum output signal from a respective row and minimum output signals from all other rows for a particular input wavelength. Preferably, in each column of the matrix, each transform coefficient means of the column is coupled to a respective one of the integrating sampling means via a switching means. The switching means is operative in accordance with a first and second time period during each Fourier transform computation cycle so that transform coefficient means to be weighted with positive polarity are connected to a reference voltage during the first time period and to the integrating sampling means during the second period, while transform coefficient means requiring a negative weight polarity are connected to the sampling means during the first period and the voltage reference during the second.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, with like numerals throughout the drawings representing like components throughout the drawings, in which:

DETAILED DESCRIPTION OF THE PREFERRED EMBODIMENTS

Figure 1:
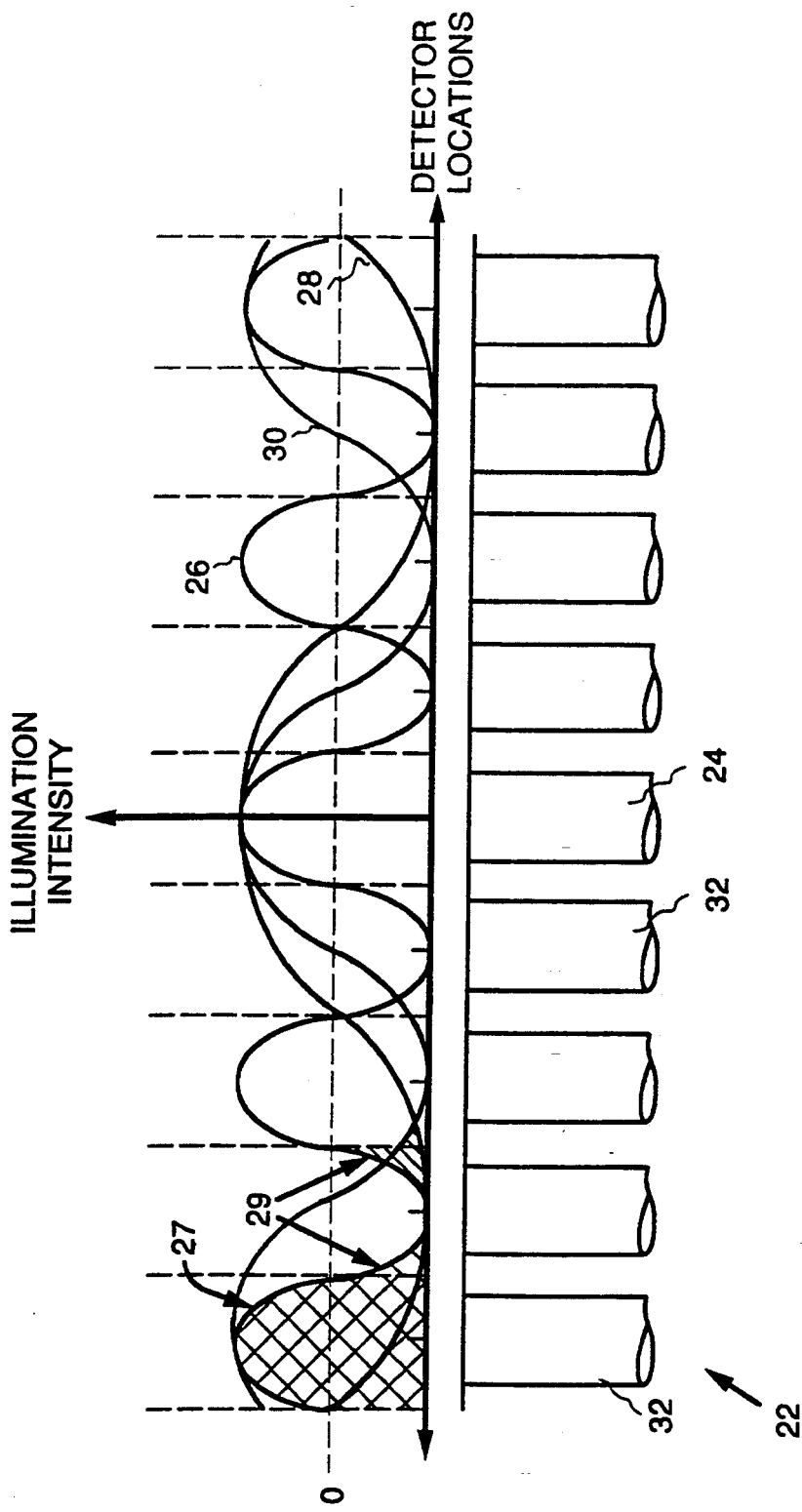
FIG. 1 is a graphical representation of the interference pattern of several potential wavelengths and capacitance means values for corresponding rows.

FIG. 1 illustrates a potential placement of detector array 22 on the interferogram (not pictured) and several of the many components, represented by waves 26, 28, and 30 with different wavelengths, present in the interferogram. The detector array requires at least enough detector means, represented by detectors 32, so that the detectors are capable of measuring the shortest fringe wavelength, represented in FIG. 1 as that of wave 26. Thus, at a minimum, the shortest wavelength of the interferogram may be exactly equal to twice the detector pitch. For the shortest wavelength, the center of each detector may correspond to either the maximum or minimum value of the wave's magnitude, and the areas of intensity at the maxima 27 would then be summed and the areas of intensity at the minima 29 would be subtracted to measure the overall intensity for that fringe wavelength. In practice, however, as discussed infra, an optimal design would limit the shortest fringe wavelength to more than twice the detector pitch. The waves in FIG. 1 are only for illustrating capacitance value calculation. They do not represent actual waves, and maximum magnitudes of actual waves will not necessarily coincide, as they are shown on center detector 24 of FIG. 1.

Figure 2:
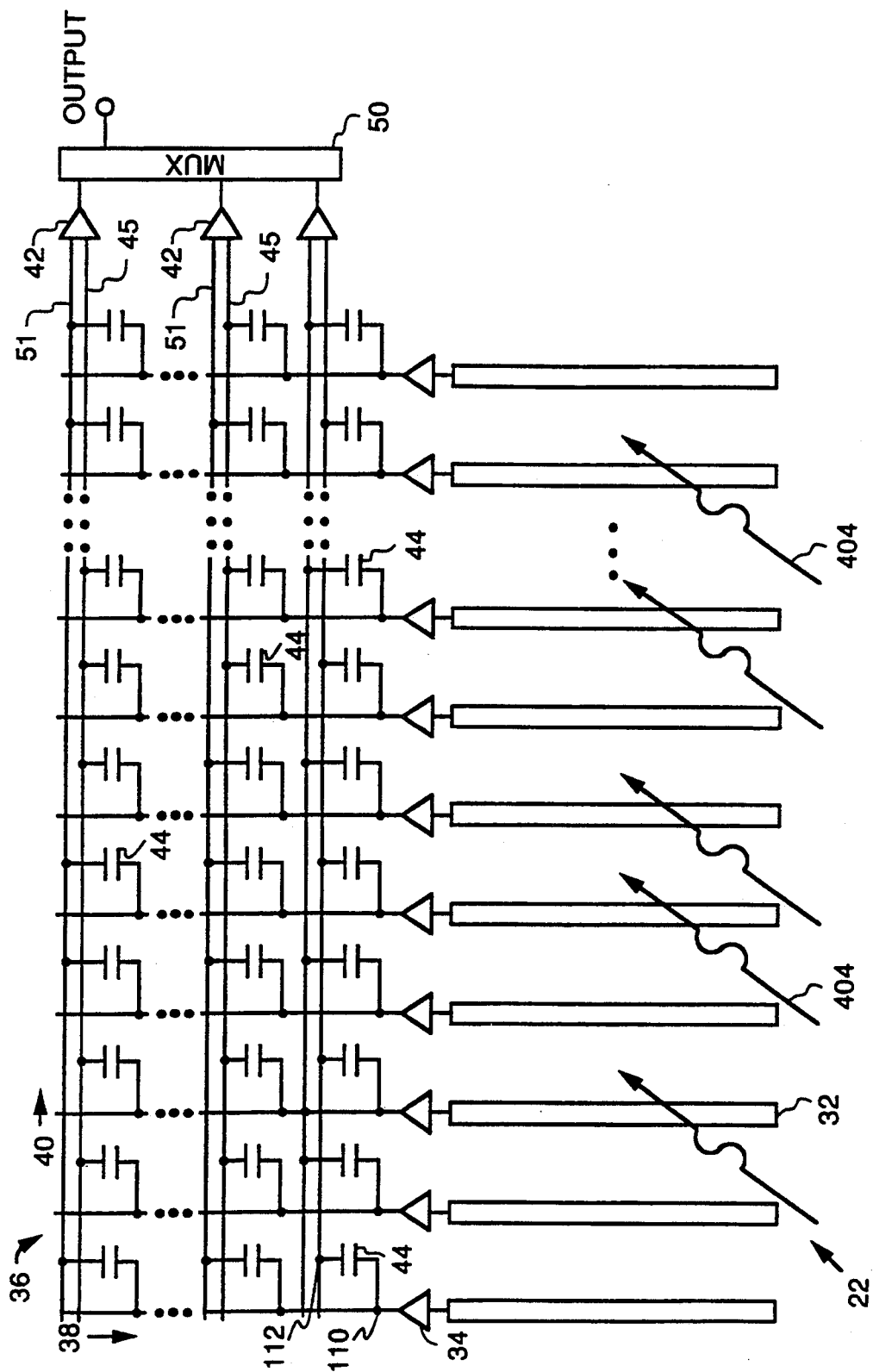
FIG. 2 is a schematic diagram of one embodiment of an analog Fourier transform architecture of the invention.

FIG. 2 is a schematic diagram of an analog Fourier transform architecture. Detector array 22 is responsive to illumination, represented by lines 404, from an interferometer means, not depicted. Preferably each detector 32 is coupled to a respective integrating amplifier means, represented by integrating amplifier 34, and each amplifier 34 is coupled to differential means such as differential amplifiers 42 through a weighted matrix 36. Integrating amplifiers 34 are not necessarily required by the invention, however, so detectors 32 may be directly coupled to weighted matrix 36. If integrating amplifiers are used, however, low noise amplifiers are desirable because they result in better performance.

The weighted matrix includes transform coefficient means which may comprise any components suitable for a weighted matrix, such as, for example, capacitors, resistors, and transistors. Preferably, capacitances 44, each having a first electrode 110 and a second electrode 112 separated by a dielectric medium, are used. In a preferred embodiment, weighted matrix 36 is comprised of a plurality of capacitances 44 arranged in a group of columns 38 and a group of rows 40. A "column" is the set of capacitances having first electrodes 110 connected to a specific detector 32 or an integrating amplifier 34, and a "row" is the set of capacitances having second electrodes 112 connected to a specific differential amplifier 42. For purposes of illustration, the group of columns 38 appears vertical in the drawing and the group of rows 40 appears horizontal, although reversal of these vertical and horizontal orientations is within the scope of the invention.

Each column of the matrix is coupled in parallel with one of the integrating amplifiers 34 (or, if no amplifiers are used, the detector). A column is coupled to a respective amplifier or detector by connecting all of the first electrodes 110 of the capacitances of the column to it. Each of the rows of the matrix is coupled in parallel to a corresponding differential amplifier 42. A row is coupled to a respective differential amplifier by connecting selected second electrodes 112 of the capacitances of the column in parallel to one input line 51 of the differential amplifier 42 and connecting alternatively selected second electrodes 112 of the capacitances of the column in parallel to the other input line 45 of the differential amplifier.

Each one of columns 38 corresponds to a physical position of detector 32, and each one of rows 40 corresponds to a specific region of fringe wavelength having a designated center wavelength. Each individual capacitance 44 thus has a value, determined both by the position of detector 32 and by the designated center wavelength corresponding to differential amplifier 42, each capacitance 44 being selected to optimize the trade-off between the goals of maximum output signal from differential amplifier 42 for a fringe of the designated wavelength and minimum output signal from all other wavelengths.

Cross-talk occurs when a signal intended for one output is detected on another output. It is not possible to both maximize an output signal and minimize cross-talk at the same time. Depending on the specific applications, a system may be designed for maximum output signal, or minimum cross-talk, or for an intermediate approach with output signal less than maximum and cross-talk greater than minimum. One well known method of compromising is to vary the amplitudes of coefficients by multiplying the detected signals by a window function. If such window function is rectangular, the amplitude of the window function is uniform across the array, with waves such as those depicted in FIG. 1 resulting when the amplitude of the window function is constant. A rectangular window function maximizes the output signal, but does not reduce cross-talk. Other window functions having the advantage of superior cross-talk performance (and the disadvantage of a correspondingly lower output signal) include, for example, Gaussian, Hanning, Blackman, and Kaiser window functions.

In FIG. 1, proper detection of wave 26 (with the shortest wavelength) will, in this example, result when capacitances 44 in FIG. 2 have a value of plus one unit alternating with a value of minus 1 unit. This symmetry occurs only because the wavelength of shortest wave 26 is exactly twice the detector pitch. Although the wavelength is twice the detector pitch in FIG. 1 for the purpose of illustrating capacitance value determination, any wavelength which is at least twice the detector pitch would be appropriate.

The values of capacitances 44 of FIG. 2 located in one of rows 40 representing waves with longer wavelengths (such as waves 28 and 30 of FIG. 1) are determined by the amplitude of the wave located in the center of each particular detector 32. It is well known that a Fourier transform can be expressed as a matrix multiplication:

$$F_k = \Sigma_j F_{kj} f_j$$

where $F_k$ is the kth component (row position) of the Fourier transform and $f_j$ is the jth photodiode (column position) input signal. In the case where the fringe wavelengths (which are different for different rows) are symmetric, $F_{kj}$ represents the capacitance 44 value which is $\cos(2\pi(j-(N+1/2)(k/N)))$ where $N/(kd)$ is the fringe wavelength for the kth row, d is the detector spacing, j is the jth detector counting from one end of the detector array, and k is the kth row.

The weighted matrix detecting system is not limited to Fourier transform applications. A Fourier transform results if the fringe wavelengths are uniformly spaced in reciprocal wavelengths. But an arbitrarily chosen wavelength can be designated on any row so long as the values of capacitances 44 on that row match the chosen fringe amplitude variation at the detector centers for the designated wavelength. To accomplish this, the capacitance values need to match the fringe variation (the deviation from the average). The focus is on the variation because while fringes vary from zero to a maximum value, capacitance weighting values vary from positive values to negative values with an average value of zero.

The desired magnitudes of capacitance weights 44 are determined by fabricating the appropriate sized capacitances. The desired polarity of a capacitance weight is achieved by connecting it to the appropriate input of the differential amplifier 42. Positive polarities are obtained by connecting to positive input 51 of differential amplifier 42, and negative polarities are obtained by connecting to negative input 45 of differential amplifier 42.

Each differential amplifier 42 receives the output signals from capacitances 44 of a respective one of rows 40. The differential amplifier then algebraically adds the output signals of capacitances 44 by taking the difference between the signal on positive input 51 and the signal on negative input 45. The output signals of all the differential amplifiers 42 are multiplexed in an output signal array 50. Each individual output signal of a respective differential amplifier 42 corresponds to a respective designated wavelength.

In a preferred embodiment, detector array 22 comprises 1024 photodiode detectors. Each of the 1024 photodiode detectors 32 is connected to a respective integrating amplifier 34 having a feedback capacitor of 0.2 pF (not shown) which is of sufficient, size to hold an expected background charge of 1.21 pCb. This type of amplifier requires about 10 µA bias current which results in about 100 mW of total dissipation. There is one differential amplifier 42 for each respective one of 200 to 400 output signals, and this type of differential amplifier also can be designed to consume less than 100 mW total power. For the case where background shot noise is large, which is the worst case, the amplifier noise may be negligible by comparison. It may be possible to further reduce amplifier power consumption by designing wider bandwidth amplifiers and pulsing them on only during the sample interval. In this case, the signal charge may be stored on the photodiode internal capacitance during integration. The weighted matrix 36 would be an array of fixed capacitors. A good candidate structure for the capacitor matrix is upper/lower polysilicon capacitors; these are easily fabricated over field oxide which minimizes stray capacitive loading. The power needed to charge and discharge the matrix is completely negligible compared with the amplifier bias power. A more detailed look at this architecture reveals that a charge proportional to the background level would exist on each of the differential amplifier inputs 51 and 45. In order to keep the matrix linear, a very large load capacitance (not shown) would be required on each of the matrix output signal lines. The output signal from each differential amplifier 42 would be a small difference between the two common mode input signals.

If variations in magnitude of capacitances 44 from the intended values (fixed pattern noise) are a problem for a particular application of the invention, one potential variation of the design will easily calibrate out such noise. If one of rows 40 is such that all the capacitances 44 have magnitudes set to 1 and positive signs, then the background can be measured for each spectrum sample. It is a simple matter to illuminate the linear detector array with a full scale background level, take a number of readings of the output signals to average temporal noise, and store this multiplicative fixed pattern noise. The stored calibration can then be used to remove fixed pattern noise from each spectrum sample.

In order to perform the analog Fourier transform, the linear detector array, integrating and differential amplifiers, and weighted matrix are preferably located on the same chip (not illustrated) to avoid the problem of having too many leads, and thus too high power. Additionally desirable are low noise, low power amplifiers such as described and claimed in commonly assigned G. J. Michon, U.S. Pat. No. 4,807,038, issued Feb. 21, 1989, which is hereby incorporated by reference.

Figure 3A:
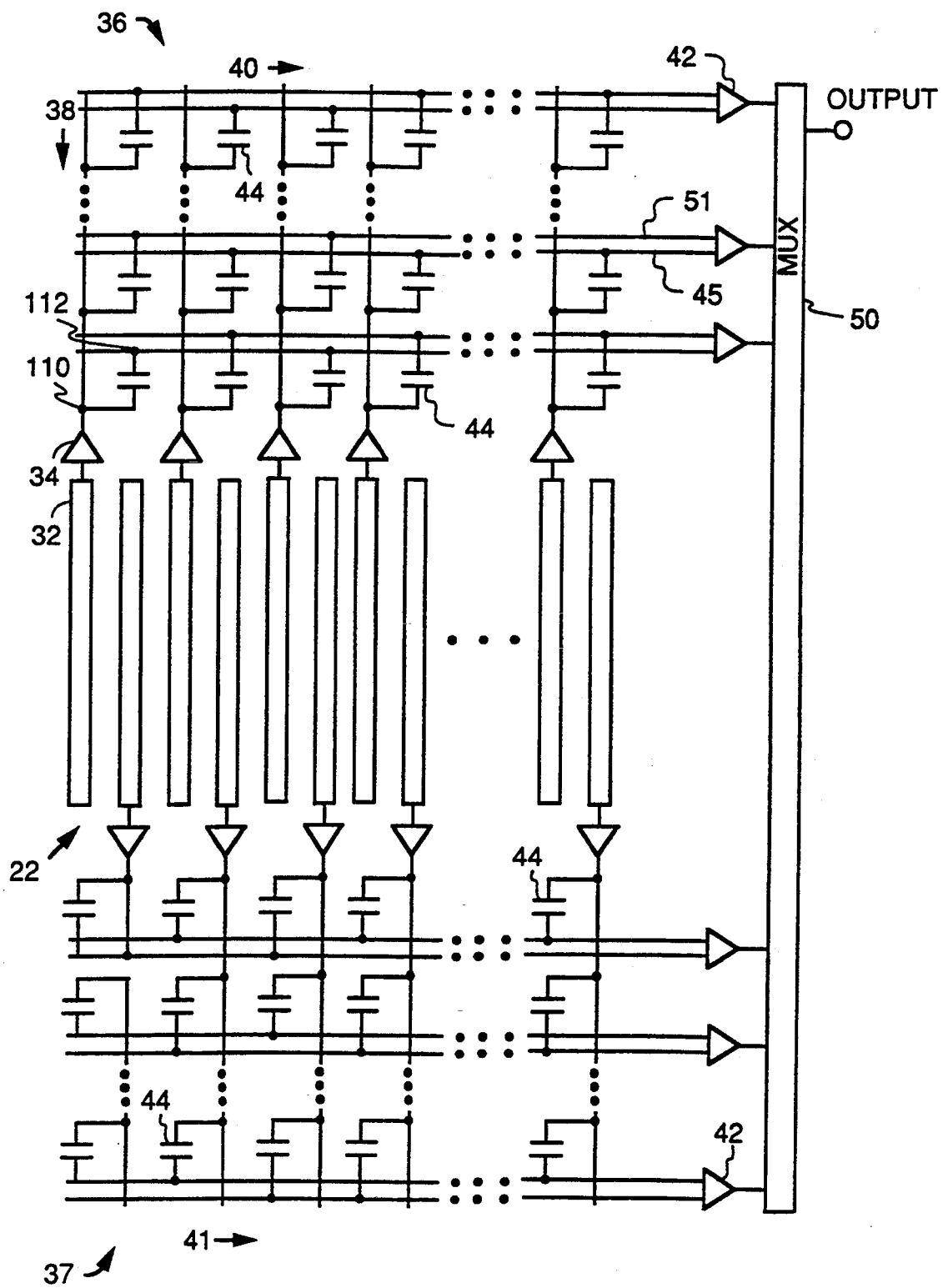
FIG. 3a is a schematic diagram of another embodiment of an analog Fourier transform architecture which is similar to FIG. 2 with the weighted matrix split into two sections for the purpose of increased diode density.

FIG. 3a depicts the configuration of FIG. 2, but with two weighted matrices 36 and 37, each on opposite sides of linear detector array 22. Typically, integrating amplifiers 34 require more space on an integrated circuit chip than detectors 32, so a useful placement of amplifiers 34 involves alternating them on either side of the detector array. For example, in the preferred design, photodiode detectors with 10 micron centers are used to sense the interferogram, thus allowing amplifiers 34 and weighted matrix 36 to be constructed on 20 micron centers. Thus, in this embodiment, one of rows 40 of upper weighted matrix 36 corresponds to a respective one of rows 41 of bottom matrix 37, and output signals of differential amplifiers 42 are added together in multiplexer 50 to produce the output signal corresponding to a specific region of fringe wavelength having a designated center wavelength. The configuration of FIG. 3a can be designed in any way in which one row of the upper weighted matrix corresponds to a respective row of the bottom matrix. This diode density increasing configuration is not necessary for a design to be within the scope of the invention since the invention is keyed to analog parallel Fourier transform, which can be performed using one matrix, or any number of matrices. As previously mentioned, it is useful for the linear detector array, the weighted matrices, and both the integrating and differential amplifiers to be located on the same chip, and in this case, the size may be even smaller than that of FIG. 2.

Figure 3B:
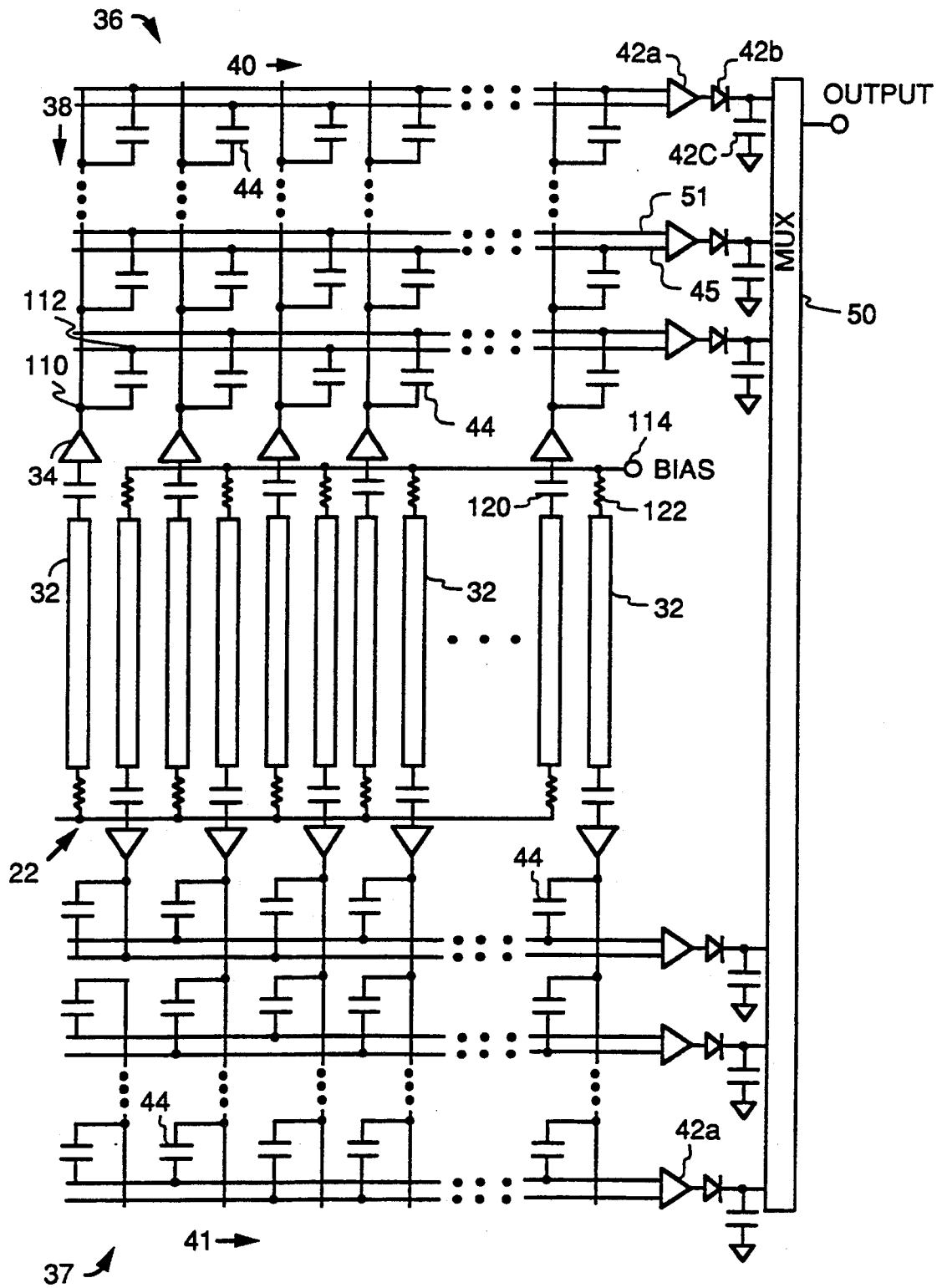
FIG. 3b is another embodiment which is similar to FIG. 3a with the addition of capacitive coupling and resistors for the purpose of measuring the wavelength of pulsed radiation.

A modification of the embodiment of FIG. 3a, shown in FIG. 3b, is suitable for detecting and measuring the wavelength of pulsed radiation such as laser pulses. In this embodiment, detectors 32 are coupled through capacitances 120 to integrating amplifiers 34 so that only the changes in radiation are amplified. Any continuous photodiode current is supplied by resistors 122 connected between each of detectors 32 and a bias source 114. In order to capture the magnitude of the pulses from the capacitance matched filters (the rows of the weighted matrix), a peak detecting amplifier comprising differential amplifier 42a, diode 42b, and capacitor 42c is used. Since the laser pulse illuminates the detectors simultaneously, the output signals are automatically synchronized. The capacitors and resistors may also be added and used with respect to the configuration of FIG. 2.

FIG. 3b indicates that peak detection (performed by diode 42b in series with capacitor 42c) follows differential amplifier 42a. If there is any mismatch in the temporal response of the two inputs to differential amplifier 42a, an extraneous difference may occur. This problem can be ameliorated by peak detecting on lines 51 and 45 and performing the difference after the peak detection operations.

Figure 4:
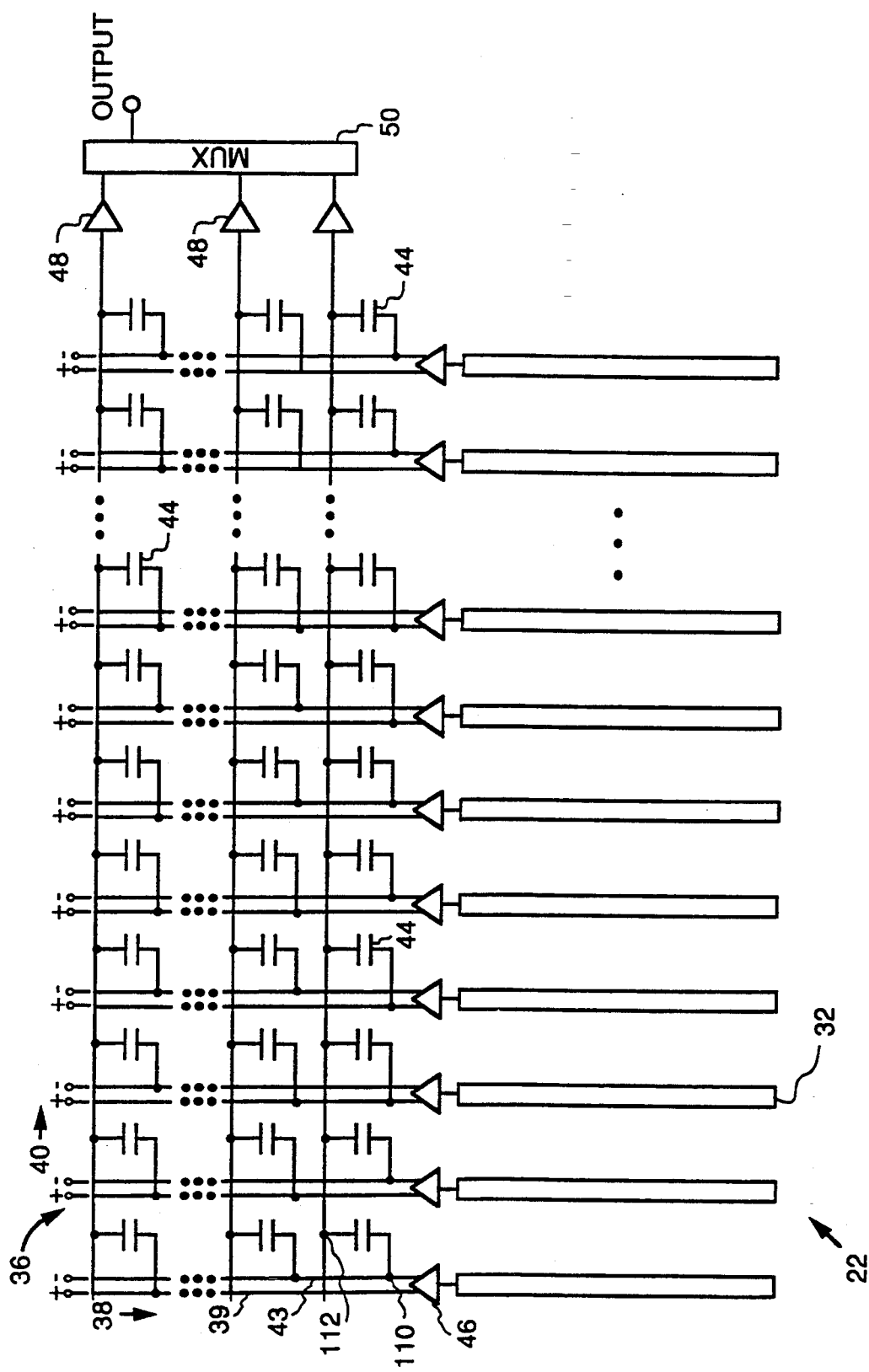
FIG. 4 is a schematic diagram of another embodiment of an analog Fourier transform architecture of the invention.

FIG. 4 is a schematic diagram illustrating another embodiment of the invention. The concept is similar to that described for FIG. 2, except that the architecture of FIG. 4 uses a different type of amplifier and does not require differential amplifiers. Each detector 32 is coupled to an integrating sampling amplifier 46 which is designed, as further described with reference to FIG. 8, to control the sign of capacitance weights 44 by sending a positive signal down one of its output signal lines 39 and a negative signal down the other output signal line 43 in parallel. The sign of each capacitance weight 44 then depends on which output signal line of a sampling amplifier 46 is attached to the first electrode 110 of capacitance 44. A row comprises capacitances 44 coupled in parallel by connecting second electrodes 112. The output signals of capacitances 44 for each of rows 40 are then the algebraic sum of the positive and negative input signals. In the preferred embodiment, optional amplifier means such as amplifiers 48 sample and hold the output signals of the weighted matrix so the output signals can be multiplexed in multiplexer 50 (output signal array) while the next array of input signals is being integrated.

The advantage of this configuration over that of FIG. 2 is that in order to keep the FIG. 2 matrix summation linear, a very large load capacitance is required on each of the matrix output lines, whereas with the configuration of FIG. 4, the matrix can operate with minimal capacitance loading and have little attenuation. Much of the background signal is cancelled along each row of the weighted matrix, thus allowing high performance with limited signal dynamic range. If fixed pattern noise remains a problem, this embodiment is susceptible of elimination of such noise in the same manner as the embodiment of FIG. 2. Additionally, as discussed in reference to the embodiment of FIG. 2, detector array 22, sampling amplifiers 46, and weighted matrix 36 are preferably located on the same chip.

Figure 5:
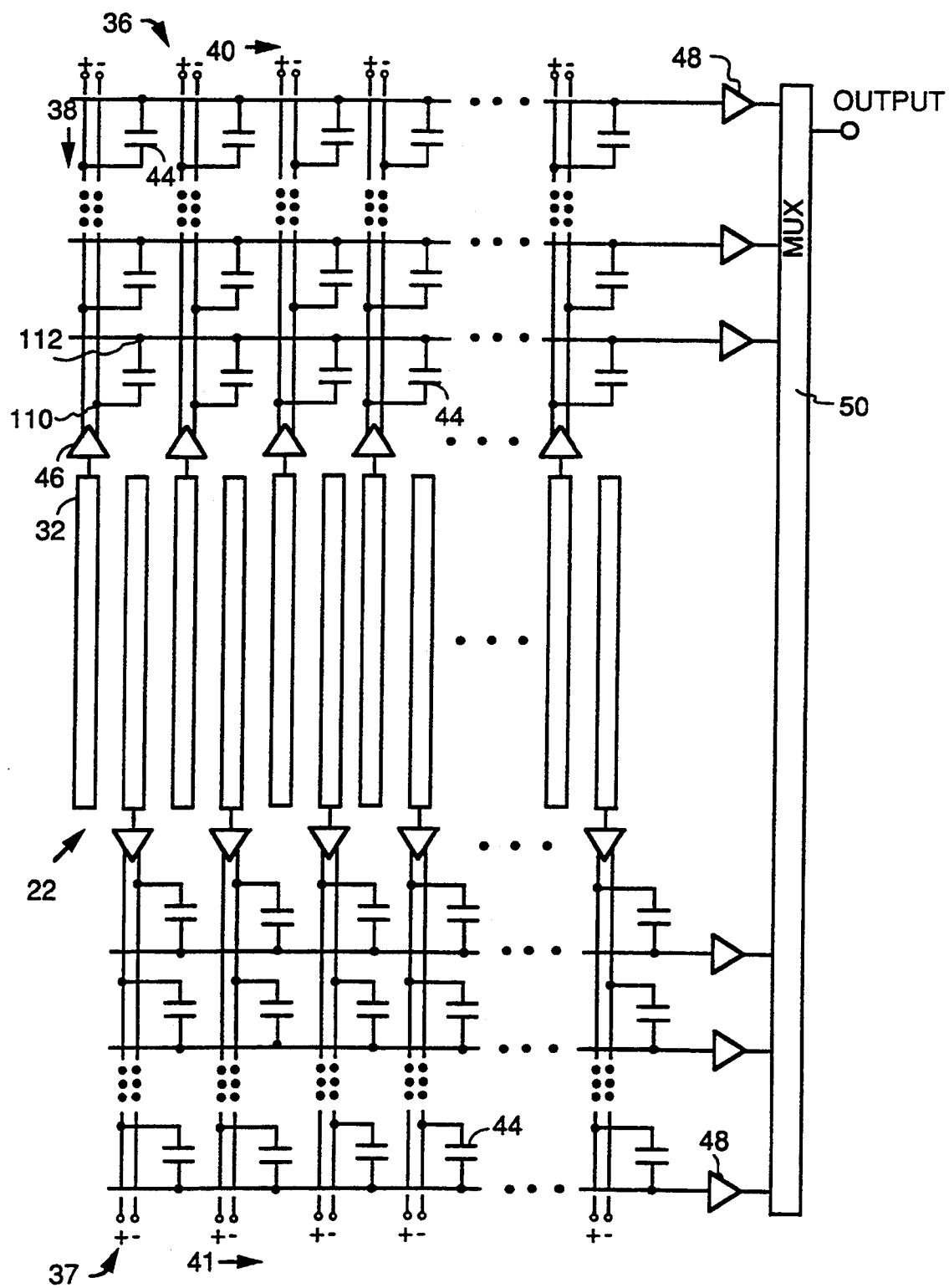
FIG. 5 is a schematic diagram of another embodiment of an analog Fourier transform architecture which is similar to FIG. 4 with the weighted matrix split into two sections for the purpose of increased diode density.

FIG. 5 is a schematic diagram of a preferred embodiment of the invention, which is a modification of the configuration shown in FIG. 4 employing a second weighted matrix 37 and is similar to the embodiment described with respect to FIG. 3a, except for the use of sampling amplifiers 46, as described with reference to FIG. 4.

In each of the configurations of FIGS. 2–5, if the interferometer is perfectly aligned, the interference pattern is exactly symmetrical, with an extremum of amplitude at the exact center of the diode array. But if the interferogram is not exactly aligned, the maximum magnitudes of the waves move off center from detectors 32 which are responsive to the pattern, and both cosine (in-phase) and sine (out-of-phase) components are contained in the fringe pattern. There are at least two ways to compensate for such misalignment.

A first method is to provide one additional row of weighting means, such as capacitances, with positive weight polarities on one side of the center of the diode array and equal capacitances with negative weight polarities on the opposite side of the center of the diode array. The output signal from this row will be equal to zero if the fringe pattern is exactly centered on the array and will become positive or negative if the fringe pattern moves off center. This output signal can be used to adjust the alignment of the optical system or detector array in the direction required to reduce the misalignment to a negligible value.

Figure 6:
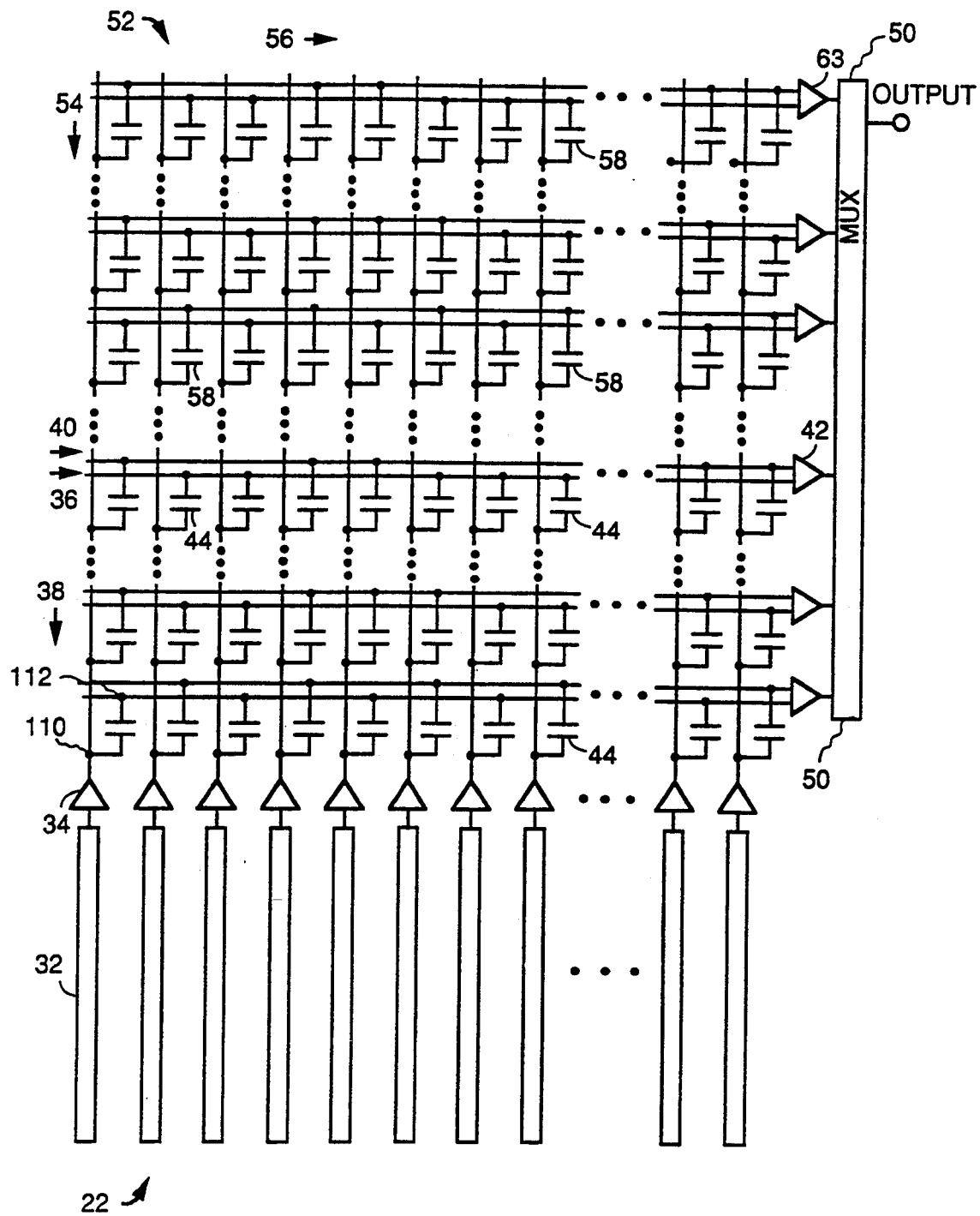
FIG. 6 is a schematic diagram of the analog Fourier transform architecture of FIG. 2 with an additional weighted matrix for measuring an out-of-phase component.
Figure 7:
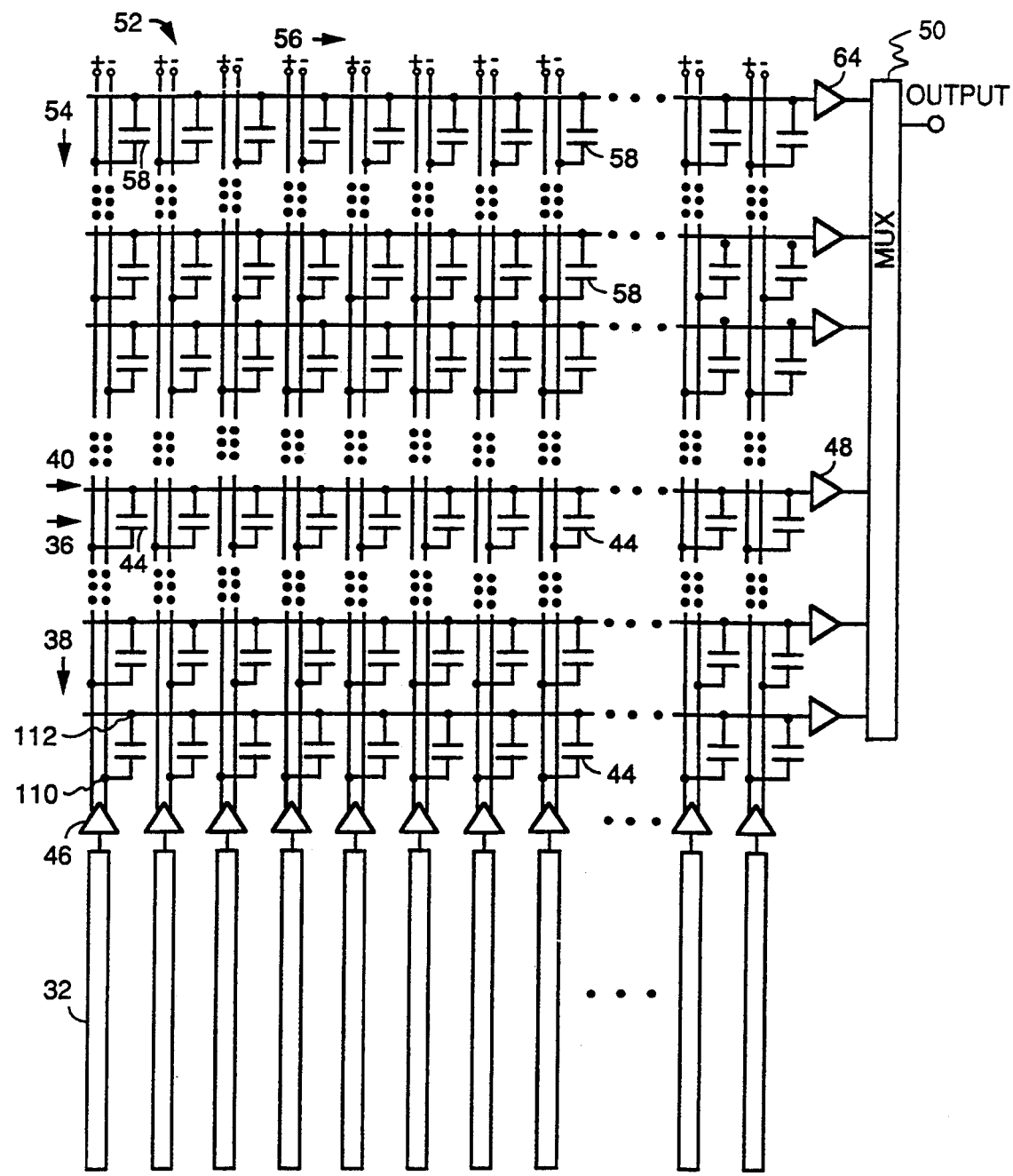
FIG. 7 is a schematic diagram of the analog Fourier transform architecture of FIG. 4 with an additional weighted matrix for measuring an out-of-phase component.

FIGS. 6 and 7 illustrate an alternative method for correcting misalignment in the embodiments of FIG. 2 and FIG. 4, respectively. An additional weighted matrix 52 may be used to measure the out-of-phase component in any of the circuit configurations of FIGS. 2 through 5. The additional weighted matrix may be comprised of a plurality of additional capacitances 58 arranged in an additional group of columns 54, and an additional group of rows 56, with each of the additional columns 54 coupled to a respective column of the group of columns 38.

As shown in FIG. 6, each of the additional rows 56 may be coupled to a respective one of a plurality of additional differential amplifiers 63; alternatively, as shown in FIG. 7, each of the additional rows 56 may be coupled to a respective one of a plurality of additional amplifiers 64. In the circuit configurations of both FIG. 6 and FIG. 7, the capacitance magnitudes are chosen to have odd symmetry with respect to the center of the diode array and be maximally responsive to a fringe wavelength that corresponds to a particular wavelength of light. These magnitudes of each of the additional capacitances 58 may be selected so as to maximize an output signal from a respective one of the additional differential amplifiers 63 or additional amplifiers 64 and minimize output signal from all other differential amplifiers 63 or amplifiers 64 of the additional weighted matrix in response to light of said particular wavelength.

In a preferred embodiment the shortest wavelength is limited to more than twice the detector pitch. Then the sampling of the interferogram is sufficient to fully characterize both the in-phase and out-of-phase components, and each wavelength has two rows of capacitances, one matched to the in-phase components and the other matched to the out-of-phase components. The magnitude of a spectral component corresponding to these two rows is equal to the square root of the sum of the in-phase component squared and the out-of-phase component squared.

Figure 8:
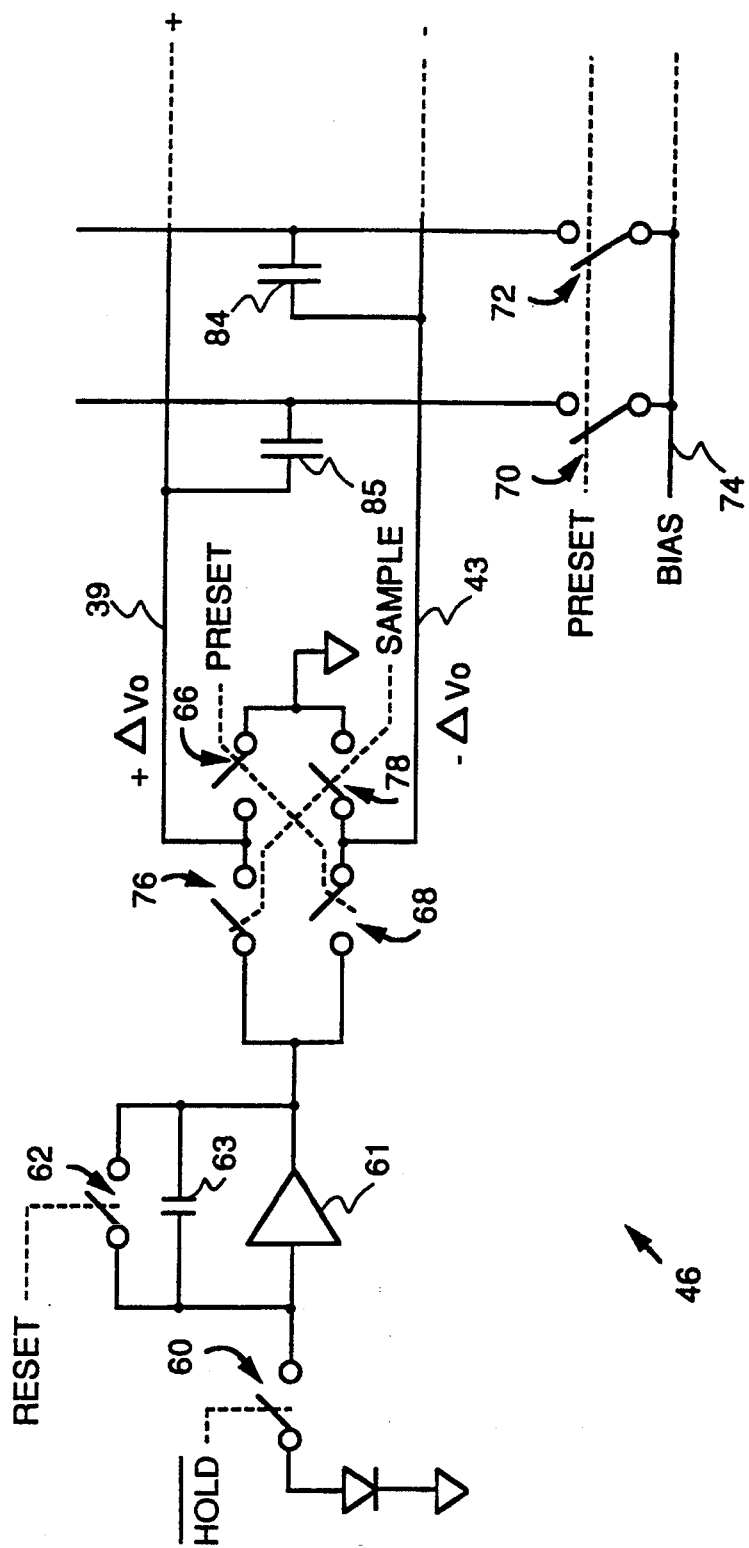
FIG. 8 is a schematic diagram of a potential configuration for an amplifier-sampler which may be used with the apparatus shown in FIGS. 4, 5, and 7.
Figure 9:
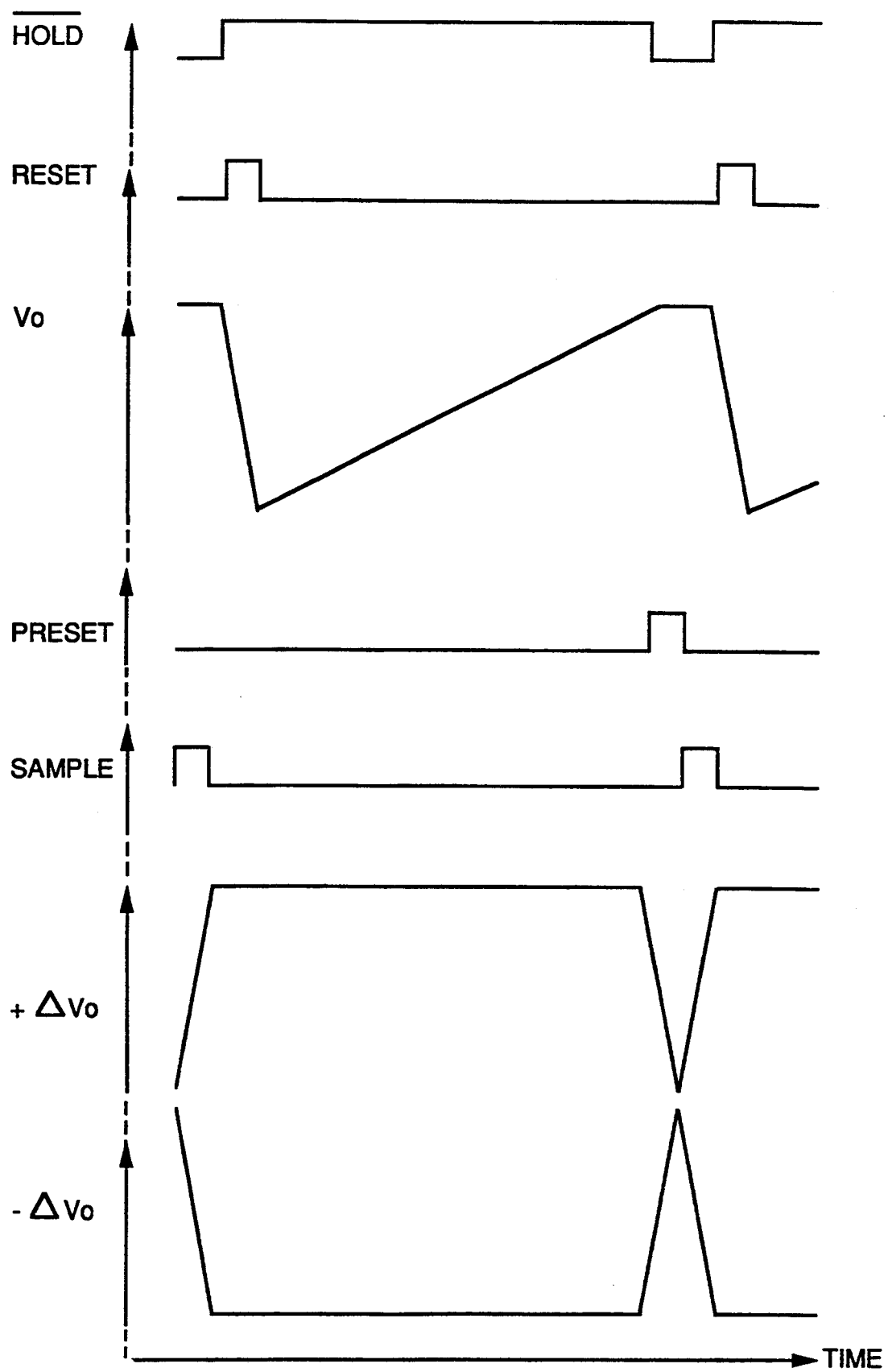
FIG. 9 is a graphical representation of timing of the amplifier-sampler illustrated in FIG. 8.

FIG. 8 is a schematic diagram of one potential configuration of an integrating sampling amplifier 46, such as shown in FIG. 4, and FIG. 9 is a timing diagram for that amplifier. The Vo, $+\Delta$Vo, and $-\Delta$Vo axes of FIG. 9 represent voltages. The Hold, Reset, Preset, and Sample lines represent the operation of switches which, for simplicity, are shown in FIG. 8 as mechanical switches but which, in actual usage, are electronic switches controlled by a clock (not shown). A high level indicates that the switch is closed, and a low level indicates a switch is open. The line over the Hold indicates that the actual Hold phase occurs when the level is low (switch open), as opposed to when the level is high, as the rest of the switches operate.

Initially the system is in hold mode with a hold switch 60 at the input to an amplifier 61 open and voltage Vo, the output signal of amplifier 61, at its peak. Then hold switch 60 is closed (hold mode is thus over) and a reset switch 62 in parallel with a capacitance 63 connected between the input and output of amplifier 61 is closed (reset is beginning) so as to equalize the values on each side of an amplifier 61 (thus the Vo signal decreases). Reset switch 62 is then opened to allow voltage Vo to build again. After Vo rebuilds, the hold is next set by opening hold switch 60, and the preset is set by closing switches 66, 68, 70, and 72. A bias 74 is not a necessary component of the configuration but is helpful to reduce the magnitude change in Vo in the manner described below, and thus reduce the power required to charge and discharge the capacitances 84 and 85, which correspond to capacitances 44 shown in FIG. 4. The bias value may be chosen so that the $\Delta$Vo is not as large as it would otherwise be if the voltage on the capacitance lines was zero.

In the preset phase, a positive line 39 is connected to ground through switch 66, while the full voltage Vo is applied to a negative line 43 through switch 68. A bias voltage below that one bias line 74 is also applied to line 43 through switch 72 and a capacitor 84 in series. After the preset phase is ended and the preset switches 66, 68, 70, and 72 are opened, the sample phase occurs in which sample switches 76 and 78 are closed and voltage Vo from amplifier 61 thus enters the positive line through switch 76. At this point, the voltage across positive capacitor 85 increases to a value of Vo minus the bias voltage, if any, and the voltage across negative capacitor 84 decreases to become the bias voltage (or if none, zero) minus Vo. These positive and negative $\Delta$Vo output signals are then applied across capacitors 85 and 84, respectively, with the resulting charge being summed on each respective row 40 and then amplified by amplifier 48 (see FIG. 4). Finally hold switch 60 closes and the sample switches are opened. The process then repeats.

Figure 10:
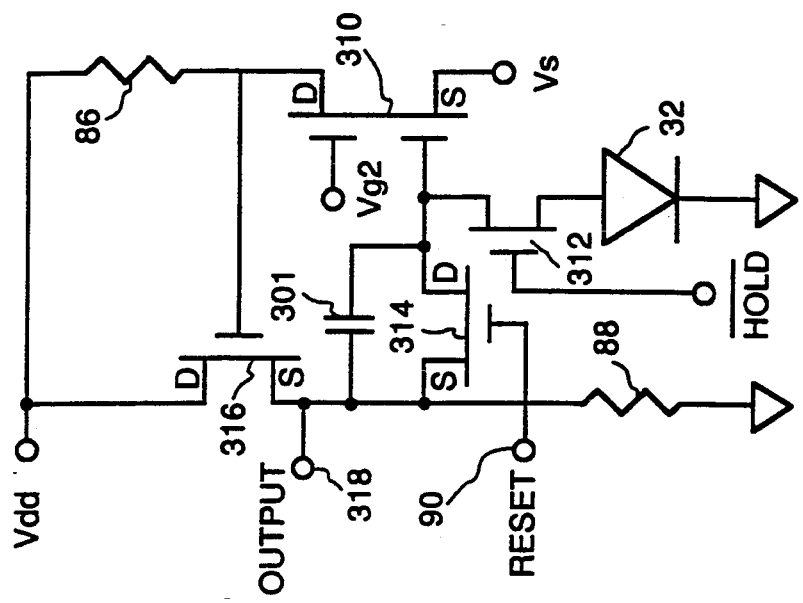
FIG. 10 is a circuit diagram of a self biasing amplifier.

FIG. 10 depicts an exemplary circuit diagram for a self-biasing amplifier which corresponds to integrating amplifier 34 (shown in FIG. 2) and to amplifier 61 (shown in FIG. 8) of sampling amplifier 46 (shown in FIG. 4). A low power, low noise P-channel cascode amplifier has been previously designed and fabricated for use in a parallel readout image sensor, as described in U.S. Pat. No. 4,807,038. A charge sensitive amplifier has been previously disclosed in G. H. Michon, "Digital Interface Circuit for High Dynamic Range Analog Sensors", U.S. application Ser. No. 07/939,333, filed Sep. 2, 1992.

The signal detected by detector 32 is supplied through field effect transistor (FET) 312 functioning as a hold switch to one side of a capacitor 301 and to one of the gates of a dual gate enhancement mode FET 310. The second gate of FET 310 is connected to a d.c. bias voltage Vg2. The source electrode of FET 310 is connected to a bias voltage source Vs, which is a threshold voltage of lower amplitude than the detector array bias voltage, and the drain electrode is connected to a voltage source Vdd through a first resistor 86.

The drain electrode of FET 310 is also connected to the gate of FET 316. The drain electrode of FET 316 is connected to the source of voltage Vdd. The source electrode of FET 316 is connected to one side of a second resistor 88 and one side of capacitor 301. A FET 314 has its source electrode connected to the common connection of the source electrode of FET 316, capacitor 301, and resistor 88 and has its drain electrode connected to the common connection FET 312, capacitor 301, and the first gate of FET 310. The gate of FET 314 is connected to a reset terminal 90.

For applications requiring low power, small size, high value resistors, depletion mode FETs can be employed. Thus resistors 86 and 88 can be comprised of depletion mode FETs. If use of the amplifier should result in insufficient stability, then an additional resistor (not shown) in series with FET 314 would be useful for stabilization.

Figure 11:
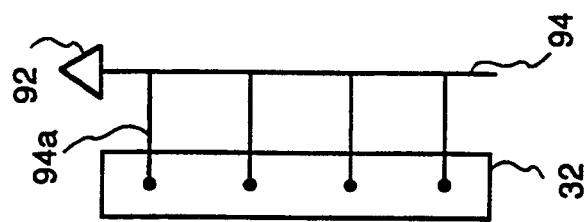
FIG. 11 is a schematic diagram which illustrates the optional addition of conductors to the detectors of FIGS. 2-7 for the purpose of noise reduction.

FIG. 11 is a schematic diagram of an optional conductor plate configuration which may be used as a detector 32 in any of the FIGS. 2–7 circuit configurations. If detectors 32 are comprised of photodiodes and photodiode resistance noise is not small as compared to noise of the detector output amplifier 92, the photodiode resistance noise can be minimized by using conductor straps 94, preferably aluminum, in the detector and connecting amplifier 92 to the straps through contacts 94a. The effect of the contact between the photodiodes and the straps is to reduce the resistance of the photodiodes. These straps can be 3 microns wide and can mask up to 30% of the photodiode light collection area. This masking reduces the signal-to-background shot noise ratio but results in a wider signal-to-noise ratio (dynamic range) under low background noise conditions.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A high speed interferometer Fourier transform spectrometer, comprising:

a linear detector array for receiving an interferogram, said linear detector array comprising a plurality of detector means;

a weighted matrix comprising a plurality of transform coefficient means, arranged in a group of columns and a group of rows, each one of said columns coupled in parallel with a respective one of said detector means; and a plurality of differential means coupled to said weighted matrix, each one of said differential means coupled to a respective one of said rows of said weighted matrix corresponding to a wavelength of said interferogram, the magnitude of a respective transform coefficient means of said weighted matrix being selected to optimize a trade-off between goals of maximum output signal from a respective one of said differential means and minimum output signal from all other differential means of said weighted matrix when said respective one of said differential means algebraically adds output signals of said transform coefficient means of said respective one of said rows.

2. The spectrometer of claim 1, further comprising a plurality of integrating means, each of said integrating means having an input coupled to a respective one of said detector means, each one of said columns of said weighted matrix being coupled in parallel to the output of a respective one of said integrating means.

3. The spectrometer of claim 2, wherein said differential means comprises a peak detecting amplifier means, and further comprising:

a plurality of capacitances, each of said capacitances coupling the input of a respective one of said integrating means to a respective one of said detector means.

a plurality of resistors, each of said resistors coupled to a respective one of said detector means; and a bias supply coupled in parallel to said plurality of resistors.

4. The spectrometer of claim 2, wherein said transform coefficient means comprise capacitances.

5. The spectrometer of claim 2, wherein said integrating means comprises a low noise P-channel cascode amplifier.

6. The spectrometer of claim 4, further comprising:

an additional weighted matrix comprising a plurality of additional capacitances arranged in an additional group of columns and an additional group of rows coupled to said weighted matrix, each one of said additional columns coupled to a respective one of said columns; and a plurality of additional differential means coupled to said additional weighted matrix, each one of said additional differential means coupled to a respective one of said additional rows of said additional weighted matrix corresponding to a wavelength of said interferogram, the magnitude of each one of said additional capacitances of said additional weighted matrix being selected by adjusting the magnitude of a respective capacitance to reflect an out-of-phase component so as to optimize a trade-off between goals of maximum output signal from a respective additional differential means of a respective one of said additional differential means and minimum output signal from all other differential means of said additional weighted matrix when said respective one of said additional differential means algebraically adds output signals of said additional capacitances of said respective one of said additional rows.

7. The spectrometer of claim 1, wherein a predetermined one of said rows of said weighted matrix comprises a plurality of weighting means, with weighting means on one side of the center of said detector array having substantially equal positive polarities and weighting means on the other side of the center of said detector array having equal weighting means values as said weighting means on said one side but with negative weight polarities.

8. The spectrometer of claim 2, wherein a predetermined one of said rows of said weighted matrix comprises a plurality of said transform coefficient means, each of said transform coefficient means in said predetermined row being of equal magnitude.

9. The spectrometer of claim 2, wherein said linear detector array, said plurality of integrating means, and said weighted matrix are located on a single integrated circuit chip.

10. The spectrometer of claim 4, wherein said detector means comprises a photodiode.

11. A high speed interferometer Fourier transform spectrometer, comprising:

a linear detector array for receiving an interferogram, said linear detector array comprising a plurality of detector means;

a plurality of integrating sampling means, each of said integrating sampling means having an input coupled to said linear detector array such that each respective one of said integrating sampling means is coupled to a respective one of said detector means; and a weighted matrix comprising a plurality of switched transform coefficient means arranged in a group of columns and a group of rows, said weighted matrix being coupled to said plurality of integrating sampling means such that each respective one of said columns is coupled in parallel to a respective output of said integrating sampling means, the magnitude of each respective one of said transform coefficient means being selected to optimize a trade-off between goals of maximum output signal from a respective one of said rows corresponding to a particular wavelength of said interferogram and minimum output signal from all other rows of said weighted matrix.

12. The high speed interferometer Fourier transform spectrometer of claim 11, further comprising a plurality of amplifier means for amplifying output signals of said weighted matrix, each respective one of said amplifier means having an input coupled to a respective row of said weighted matrix corresponding to a wavelength in said interferogram.

13. The spectrometer of claim 12, wherein each of said integrating sampling means comprises:

an integrator responsive to the output signal of one of said detector means;

switching means coupled to said integrator for channeling the output signal of said one detector means between two alternative lines of one of said columns, one of said two alternative lines corresponding to transform coefficient means for providing a positive output signal for said integrating sampling means, the other of said two alternative lines corresponding to transform coefficient means for providing a negative output signal for said integrating sampling means.

14. The spectrometer of claim 13, wherein each of said transform coefficient means comprises a respective capacitance.

15. The spectrometer of claim 13, wherein each of said integrators comprises a respective P-channel cascode amplifier.

16. The spectrometer of claim 14, further comprising:
an additional weighted matrix comprising a plurality of additional capacitances arranged in an additional group of columns and an additional group of rows, coupled to said weighted matrix, each one of said additional columns coupled to a respective one of said columns; and
a plurality of additional amplifier means, coupled to said additional weighted matrix, each one of said additional amplifier means coupled to a respective one of said additional rows of said additional weighted matrix corresponding to a wavelength, the magnitude of each one of said additional capacitances of said additional weighted matrix being selected by adjusting the magnitude of a respective capacitance to reflect an out-of-phase component so as to optimize a trade-off between goals of maximum output signal from a respective additional amplifier means and minimum output signal from all other amplifier means of said additional weighted matrix when said respective one of said additional amplifier means amplifies output signals of said additional capacitances of said respective one of said additional rows.

17. The spectrometer of claim 11, wherein a predetermined one of said rows of said weighted matrix comprises a plurality of weighting means, with weighting means on one side of the center of said detector array having substantially equal positive polarities and weighting means on the other side of the center of said detector array having equal weighting means values as said weighting means on said one side but with negative weight polarities.

18. The spectrometer of claim 12, wherein a predetermined one of said rows of said weighted matrix comprises a plurality of said transform coefficient means, each of said transform coefficient means of said predetermined row being of equal magnitude.

19. The spectrometer of claim 12, wherein said linear detector array, said plurality of integrating sampling means, and said weighted matrix are located on a single chip.

20. The spectrometer of claim 14, wherein said capacitance comprises a polysilicon capacitor.

21. The spectrometer of claim 15, wherein said detector means comprises a photodiode.

22. The spectrometer of claim 21, wherein said linear detector array further comprises conductor straps coupled to said photodiodes for reducing photodiode resistance noise.

23. A high speed interferometer Fourier transform spectrometer, comprising:
a linear detector array for receiving an interferogram, said linear detector array comprising a plurality of detector means;
a plurality of integrating sampling means coupled to said linear detector array, each respective one of said integrating sampling means being coupled to a respective one of said detector means;
a weighted matrix comprising a plurality of switched capacitances arranged in a group of col-runs and a group of rows, each respective one of said col-runs being coupled in parallel to a respective one of said integrating sampling means, the magnitude of each respective capacitance of said weighted matrix being selected to optimize a trade-off between goals of maximum output signal from a respective one of said rows corresponding to a particular wavelength of said interferogram and minimum output signal from all other rows of said weighted matrix; and
a plurality of amplifier means for amplifying the output of said weighted matrix, each one of said amplifier means being coupled to a respective one of said rows corresponding to a wavelength of said interferogram received by said spectrometer.

24. The spectrometer of claim 23, wherein said integrating sampling means comprises:
an integrator responsive to the output signal of said detector means; and
switching means coupled to said integrator for channeling the output signal between two alternative lines of one of said columns, one of said two alternative lines corresponding to a capacitance for providing a positive output signal for said integrating sampling means, the other of said two alternative lines corresponding to a capacitance for providing a negative output signal for said integrating sampling means.

* * * * *